Figure 1:
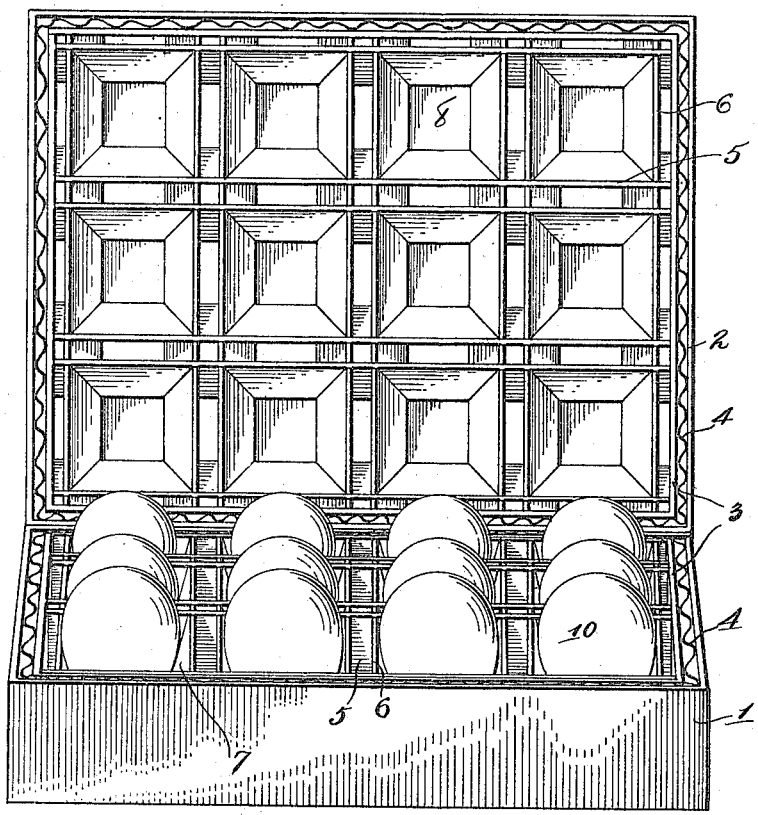

V. BENGSTON.
EGG CASE.
APPLICATION FILED OCT. 17, 1914.

1,185,048.

Patented May 30, 1916.
2 SHEETS—SHEET 1.

Witnesses
Edw. S. Hall.
Wm. H. Downing

Inventor
Victor Bengston.
By Richard B. Owen,
Attorney

V. BENGSTON.
EGG CASE.
APPLICATION FILED OCT. 17, 1914.
1,185,048.
Patented May 30, 1916.
2 SHEETS—SHEET 2.
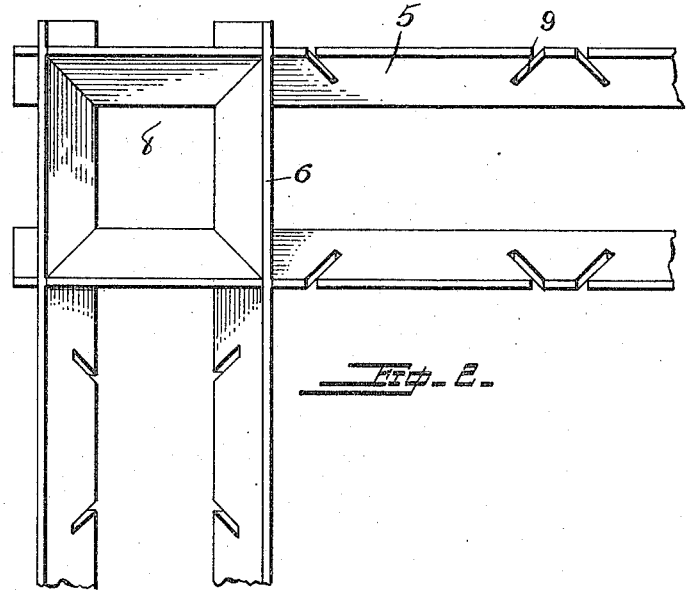
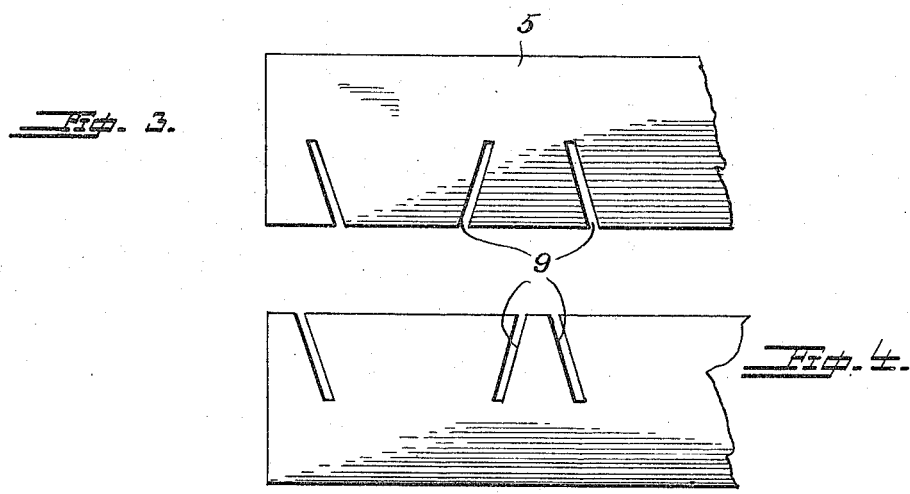
Witnesses
Edw. S. Hall.
Wm. H. Downing
Inventor
Victor Bengston.
By Richard Owen,
Attorney

UNITED STATES PATENT OFFICE.

VICTOR BENGSTON, OF NEW BRITAIN, CONNECTICUT.

EGG-CASE.

1,185,048.

Specification of Letters Patent. Patented May 30, 1916.

Application filed October 17, 1914. Serial No. 867,155.

*To all whom it may concern:*

Be it known that I, VICTOR BENGSTON, a citizen of the United States, residing at New Britain, in the county of Hartford and State of Connecticut, have invented certain new and useful Improvements in Egg-Cases, of which the following is a specification.

My invention relates to egg cases.

The primary object of my invention resides in the provision of a novel egg case especially adapted for service through the parcel post, the case being so constructed to withstand the shocks and jars received during transportation and to protect the eggs therein and reduce the liability of breakage to a minimum.

Another object of my invention resides in the provision of a receptacle having a cover therefor, both the receptacle and cover being provided with means coöperating with each other for receiving and protecting the eggs, the means when placed in registration being in alinement for conforming substantially to the shape of an egg.

A further object of my invention resides in the provision of a novel means for reinforcing the receptacle and cover, thus increasing the durability of the same.

A still further object of my invention resides in the provision of a plurality of transversely and longitudinally extending and interlocked strips, the latter being so arranged to provide tapering cells which are arranged in uniformly spaced relation with each other so as to allow for a slight bending of either of the cells when an unusually large egg is placed therein.

A still further object of my invention resides in the provision of novel supporting frames positioned both within the receptacle and cover, coöperating with both the reinforcing and the receiving and protecting means for maintaining these last-mentioned means in their proper position.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings: Figure 1 is a perspective view of my invention, Fig. 2 is an enlarged fragmentary top plan view of the strips showing the same interlocked; Fig. 3 is a fragmentary side elevational view of a portion of the upper of the strips; and Fig. 4 is an enlarged fragmentary view of one of the lower strips showing to advantage the manner in which the same are slotted to provide the novelly arranged cells.

Referring more particularly to the drawings in which similar reference numerals designate like or corresponding parts throughout the different views, I provide a substantially rectangular receptacle 1, formed preferably of stiff card-board, the latter having hinged to one of the upper longitudinal edges thereof a similarly shaped cover 2, the lower edges of which are adapted for engagement with the upper edges of the receptacle and are supported thereby. Disposed within both the receptacle and cover are substantially rectangular supporting frames 3, the frames being arranged in close parallel relation with the sides and ends of the receptacle and cover for a purpose to be hereinafter referred to. In order to reinforce the receptacle and cover, I have provided a suitable reinforcing means which in this instance consists essentially of strips of corrugated paper 4, the latter being disposed between the supporting frames 3 and the sides and end of both the cover and receptacle and arranged therethrough about the entire length thereof as clearly shown in the drawings.

Removably mounted in both the receptacle and cover and positioned within the supporting frames therein are a plurality of longitudinally and transversely extending interlocked strips 5 and 6, which strips provide egg receiving cells 7 and protecting cells 8. These cells are uniformly spaced from each other and are tapered toward their inner ends by slitting the strips inwardly from their contacting edges and arranging the slits in pairs and in divergent relation with each other as clearly shown at 9. The slits in the bottom edge of the upper of the strips are arranged slightly farther apart than those extending from the upper edges of the lower of the slits in order to provide the uniformly tapering cells. By providing this arrangement and arranging the cells in spaced relation with each other, the sides of the cells are permitted to bend, thus facilitating the reception of the various size eggs without allowing the same to come into immediate contact with the eggs in the adjacent cell. The supporting frames 3 being arranged in engagement with the ends of the strips 5 and 6 absolutely prevent movement of the same thus holding the cells in one position. Attention is directed to the fact that when the cover 2 is folded upon the receptacle the protecting cells 8 are arranged in alinement with the receiving cells 7 and because of their tapering formation, contact with substantially the entire upper surface of the eggs 10 within the cells 7 and thus afford ample protection thereto. It is understood that the functions of these cells are substantially similar to the function of the egg receiving cells 7 and in the event that the receptacle is inverted it is apparent that no harm will befall the eggs due to this peculiar arrangement and formation. This is an advantage of my invention on which I desire that great stress be laid.

Although I have shown and described the preferred embodiment of my invention, I desire to be understood that I am not to be limited to the exact details shown, however great stress should be laid upon the arrangement of the complementally formed receiving and protecting means for the eggs.

It is obvious from the accompanying drawings that my invention can be readily applied to cases for containing a large number of eggs, and it is thought that it would be an obvious expedient to provide a crate with trays or partitions for receiving the supporting frames and cells.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:

An egg case including a receptacle having a bottom, a cover removably associated with a receptacle, supporting frames conforming to the contour of and arranged in uniformly spaced relation with the inner surfaces of the walls of the receptacle and cover, corrugated strips of reinforcing material disposed between and arranged in intimate contact with the supporting frames and inner surfaces of the walls of the receptacle and cover, a plurality of transversely arranged and longitudinally extending strips interlocked to provide egg receiving cells, said strips being removably mounted in the receptacle and engaging the bottom and also removably mounted in the cover, the ends of the strips adjacent the end cells being arranged in frictional engagement with the inner surfaces of the frames, and the cells provided in the receptacle and in the cover being arranged in registration with each other when the cover is in a closed position.

In testimony whereof I affix my signature in presence of two witnesses.

VICTOR BENGSTON.

Witnesses:
H. A. HAYDEN,
HENRY HOAR.